United States Patent Office 3,842,170
Patented Oct. 15, 1974

3,842,170
SOLUBILIZED ASPIRIN
Louis Anthony Luzzi, Clyde Weydell Whitworth, and Hung Won Jun, Athens, Ga., assignors to Research Corporation, New York, N.Y.
Filed Apr. 13, 1973, Ser. No. 350,716
Int. Cl. A61k 27/00
U.S. Cl. 424—234    7 Claims

ABSTRACT OF THE DISCLOSURE

A stabilized aspirin composition has been found which is comprised of acetylsalicylic acid and a blocked polyhydric alcohol wherein at least one of the protons of the OH groups in a polyhydric alcohol is replaced with a blocking group such that transesterification between said polyhydric alcohol and said acetylsalicylic acid is hindered.

BACKGROUND OF THE INVENTION

Field of the Invention

This invention relates to a method of stabilizing acetylsalicylic acid compositions. More particularly, it relates to a method of stabilizing acetylsalicylic acid compositions with OH blocked polyhydric alcohols.

Description of the Prior art

In the past, attempts have been made to solubilize acetylsalicylic acid or to convert it to a fluid form in order to render acetylsalicylic acid compositions more palatable. This is particularly important for those people who find it difficult to consume tablets containing acetylsalicylic acid. Also, the administration of acetylsalicylic acid in pediatric practice is often difficult when tablets have to be sectioned in halves or quarters in order to provide the proper dosage of the drug for children. Thus, a need has existed for fluid compositions of acetylsalicylic acid for the accurate and convenient administration of the drug.

It has been known that in various pharmaceutical dosage forms, especially the liquid dosage forms, acetylsalicylic acid undergoes decomposition in the presence of water, aqueous or monohydroxy alcoholic solutions to salicylic acid and acetic acid. Several attempts have been made to formulate stable fluid solutions or suspensions of acetylsalicylic acid in a solvent mixture of high proof ethyl alcohol and high test anhydrous glycerin (U.S. Pat. 1,787,924) and in glycerin and propylene glycol solvents (U.S. Pat. 3,316,150 and British Pat. 1,147,348). In addition, polyethylene glycol suppository bases have been formulated which may contain acetylsalicylic acid or other medicinal agents (U.S. Pat. 2,975,099). However, it has been found that significant decomposition of acetylsalicylic acid still occurs in polyhydric alcohol bases despite the apparent absence of water. This factor is not as important as the hydrolytic effect water has on acetylsalicylic acid, but it is a significant factor when the "shelf-life" of anhydrous polyhydric alcohol-acetylsalicylic acid compositions is involved. The prior art has sought a solution to the problem of deterioration of acetylsalicylic acid by forming compositions of the acid in polyhydric alcohol bases, but these attempts have only been partially successful. It is now shown that the decomposition of acetylsalicylic acid in apparently anhydrous polyhydric alcohols occurs via a transesterification reaction in which salicylic acid and acetylated polyhydric alcohol are produced. Specifically, the decomposition of acetylsalicylic acid has been shown to occur via a transesterification reaction with a polyethylene glycol base to product salicylic acid and polyethylene glycol acetate.

A need, therefore, exists for acetylsalicylic compositions in which decomposition of the acid by hydrolysis and by transesterification is avoided. In particular, a need exists for fluid compositions of acetylsalicylic acid which are stable to decomposition via hydrolysis and transesterification.

SUMMARY OF THE INVENTION

Accordingly, one object of the invention is to provide stable polyhydric alcohol based compositions of acetylsalicylic acid in which decomposition of the acid via hydrolysis and transesterification with the polyhydric alcohol base is avoided.

Another object of the invention is to provide stable fluid solutions of acetylsalicylic acid in which hydrolysis and transesterification of the acid is avoided by the use of a polyhydric alcohol base in which at least one of the terminal OH groups is deactivated by a blocking group.

Briefly, these and other objects of the invention as hereinafter will become readily apparent can be attained by a pharmaceutical preparation which comprises acetylsalicylic acid (aspirin) and a carrier consisting essentially of a polyhydric alcohol in which at least one of the OH groups of said polyhydric alcohol is blocked with a suitable blocking group such that transesterification between said polyhydric alcohol and said acetylsalicylic acid is hindered.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
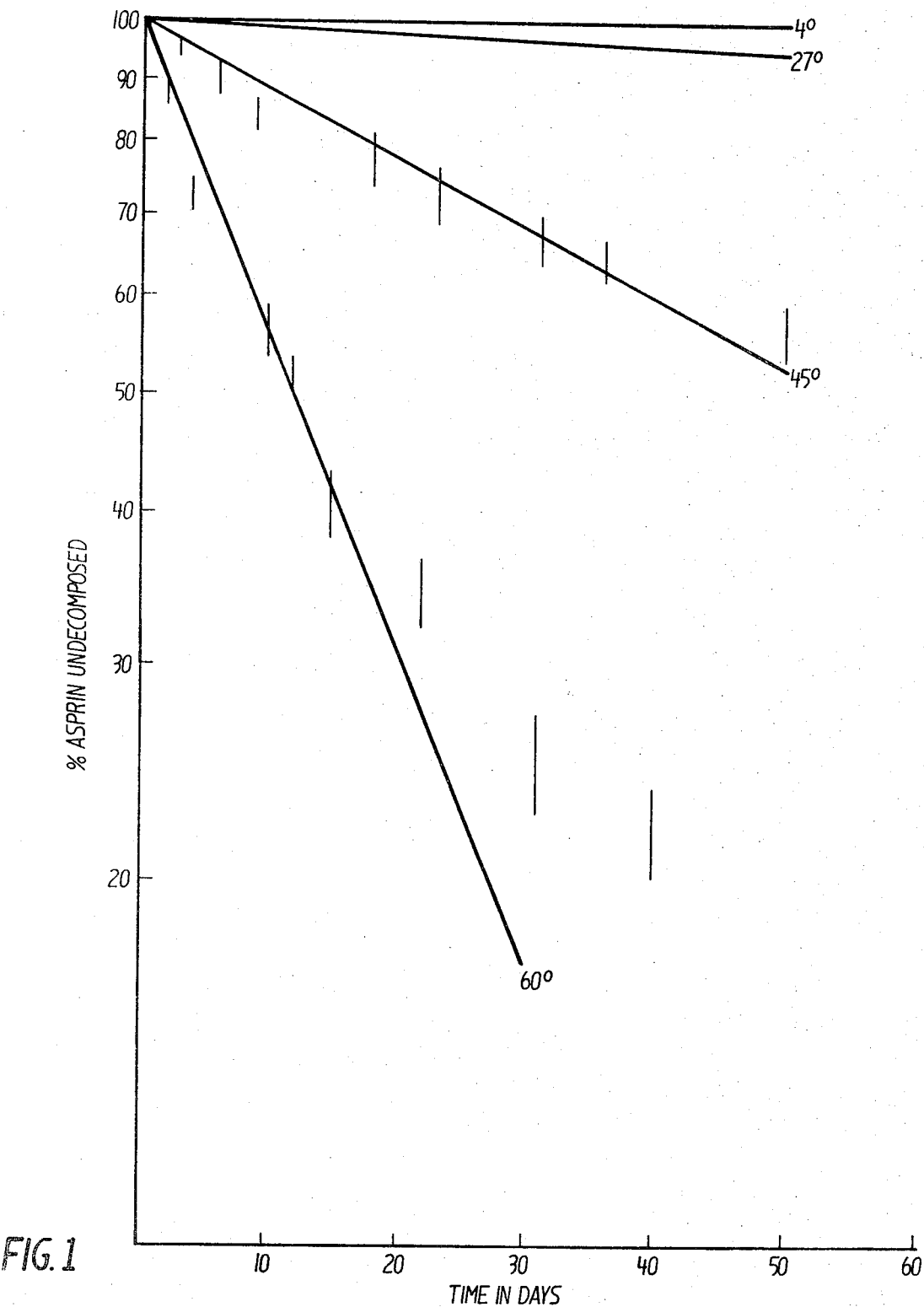
FIG. 1 is a plot of the percent aspirin undecomposed versus time in days.

It has been found that fluid acetylsalicylic acid will decompose in apparently anhydrous polyhydric alcohol, such as polyethylene glycol. The fact that the decomposition of the acid is not caused by the presence of extraneous amounts of water is confirmed by the absence of acetic acid, which would be present if the degradation was a result of hydrolysis. The absence of acetic acid has been confirmed by the lack of methyl group absorption of acetic acid in the nmr spectrum of a solution acetylsalicylic acid in various apparently anhydrous polyhydric alcohols. It has now been discovered that the decomposition of acetylsalicylic acid occurs by transesterification of the acid with the polyhydric alcohol as well as by hydrolysis due to the presence of water. This transesterification mode of decomposition was confirmed by the appearance of the methyl protons of the acetate moiety of polyhydric alcohol acetate in the nmr spectrum of aged samples of acetylsalicylic acid in various polyhydric alcohols. The supposed absorption of the methyl protons of the acetate moiety of the polyhydric alcohol acetate was confirmed by the appearance of the same absorption pattern in a portion of an acetylsalicylic acid solution containing authentic samples of the polyhydric alcohol acetate, particularly of polyethylene glycol acetate.

The evidence gathered concerning the decomposition of acetylsalicylic acid in polyhydric alcohols has led to the realization that the decomposition of acetylsalicylic acid in polyhydric alcohol solutions can be avoided by blocking the OH terminal groups of the polyhydric alcohols such as polyethylene glycol so that transesterification reactions with acetylsalicylic acid are substantially reduced.

Any polyhydric alcohol which can be used pharmaceutically in combination with aspirin can be treated so as to block at least one of the OH groups, and the degree of transesterification will be decreased by a significant extent. Suitable polyhydric alcohols include polyalkylene diols such as polyethylene glycol, polypropylene glycol, polybutylene glycol, polyisobutylene glycol and polyamylene glycol; poly($\alpha,\omega$)-alkylenediols such as poly(1, 3) - propanediol, poly(1,4)-butanediol, poly(1,3)-isobutylenediol, poly(1,5) - pentanediol, poly(1,4) - pentanediol, poly(1,3) - pentanediol, poly(1,6)-hexanediol, poly(1,5) - hexanediol, poly(1,4) - hexanediol, poly(1,3)-hexanediol; alkylene diols such as ethylene glycol, propylene glycol, 1,3-propanediol, butylene glycol, isobutylene glycol, 1,4-butanediol, amylene glycol, isoamylene glycol, 1,4 - pentanediol, 1,5-pentanediol, 1,2-hexanediol, 1,3 - hexanediol, 1,4-hexanediol, 1,5-hexanediol and 1,6-hexanediol; and alkylenetriols such as glycerine, 1,2,3-butanetriol, 1,2,4-butanetriol, 1,2,3-pentanetriol, 1,2,4-pentanetriol, 1,2,5-pentanetriol, 1,2,3-hexanetriol, 1,2,4-hexanetriol, 1,2,5-hexanetriol, 1,2,6-hexanetriol, 1,3,4-hexanetriol, 1,3,5-hexanetriol and 1,3,6-hexanetriol.

Suitable blocking groups for the polyhydric alcohols include loweralkylacyl such as formyl, acetyl, propionyl and butyryl; arylacyl such as benzoyl, xyloyl, toloyl, 1-naphthoyl, and 2-naphthoyl; aralkylacyl such as phenylacetyl, phenyl - 3-propionyl and phenyl-4-butyryl; lower alkyl ether such as methoxy, ethoxy, propoxy, isopropoxy, butoxy, and t-butoxy; aryl ether such as phenoxy, tolyloxy, xylyloxy, 1-naphthoxy and 2-naphthoxy; and loweraralkyl ether such as phenylmethoxy, phenylethoxy, phenyl - 3-propoxy, phenyl-2-propoxy, phenyl-2-butoxy. It is not necessary to block all of the OH groups of the polyhydric alcohol. Even the blocking of one OH group will result in materially decreasing the extent of decomposition. For instance, at 45° C. over a 30 day period fully one quarter of the aspirin in a polyethylene glycol base composition decomposes. In comparison, it was found that virtually no decomposition was noted for aspirin in a base of polyethylene glycol acetate under the same conditions.

Suitable blocked polyhydric alcohols which can be used in combination with aspirin include methoxypolyethylene glycol, ethoxypolyethylene glycol, phenoxypolyethylene glycol, phenylmethoxypolyethylene glycol, phenylethoxypolyethylene glycol, methoxypolypropylene glycol, ethoxypolypropylene glycol, phenoxypolypropylene glycol, phenylmethoxypolypropylene glycol, phenylethoxypolyethylene glycol, polyethylene glycol formate, polyethylene glycol acetate, polyethylene glycol propanoate, polyethylene glycol benzoate, polyethylene glycol toluate, polypropylene glycol formate, polypropylene glycol acetate, polypropylene glycol propanoate, polypropylene glycol benzoate and polypropylene glycol toluate.

The blocked polyhydric alcohols may be used in an amount of 40% to 99.9% by weight to 60-0.1% by weight of aspirin, and preferably 70% to 95% by weight per 30 to 5% by weight. While the temperature at which the components of the composition are mixed is not critical, it is preferred to mix the components at temperatures from 5 to 35° C.

Other additives can be added to the aspirin-blocked polyhydric alcohol compositions such as flavoring agents, sweetening agents and other drugs. Suitable flavoring agents include vanilla, chocolate, cherry, grape and raspberry, etc. Suitable sweetening agents include sugars such as glucose, fructose, sucrose, sorbitol, and lactose; and artificial sweeteners such as saccharin, cyclamate, etc. Suitable drugs which may also be incorporated include propoxiphene, codeine, chlorpheneramine, pyrabenzamine or other analgesic and antihistaminic drugs. Also sedatives such as the barbituates and tranquilizers.

In the formulation of the aspirin compositions, aspirin is normally mixed with a blocked polyhydric alcohol under the indicated composition ranges and mixing conditions. It is important in the formulation of the compositions of the invention that no unblocked polyalkylene glycols be present in the fluid compositions since gradual deterioration of the compositions will ensue at rates commensurate with the amount of unblocked alcohol present.

The extent to which aspirin decomposes in anhydrous polyethylene glycol was established by spectrophotofluorometric analysis of a series of solutions of 10% aspirin in polyethylene glycol 400, 10% aspirin in polyethylene glycol 1600, 10% aspirin in polyethylene glycol 4000 and 10% aspirin in polyethylene glycol 6000. Four samples of each of the four solutions were stored in air-tight amber containers at temperatures of 4°, 27°, 45°, and 60° respectively. In the spectrophotofluorometric determination of aspirin and salicylic acid in all sixteen samples, the uncorrected excitation and emission maximum for aspirin and salicylic acid were 280 nm and 350 nm, and 312 nm and 450 nm respectively. FIG. 1 is a semilogarithmic plot of the percent undecomposed aspirin of the four solutions maintained at the temperatures indicated versus time in days. Obviously, the most extensive decomposition of aspirin occurred at 60° C. over a period of forty days. At all of the temperatures, the decomposition reactions appeared to follow pseudo first-order kinetics. Vertical lines are used on the 45° and 60° C. curves to indicate the range of aspirin remaining in polyethylene glycol 400, 1600, 4000 and 6000 at each time interval. Ranges are shown since no distinction of the effect on the degradation of aspirin in the polyethylene glycols used could be found at the two temperatures indicated.

Figure 2B:
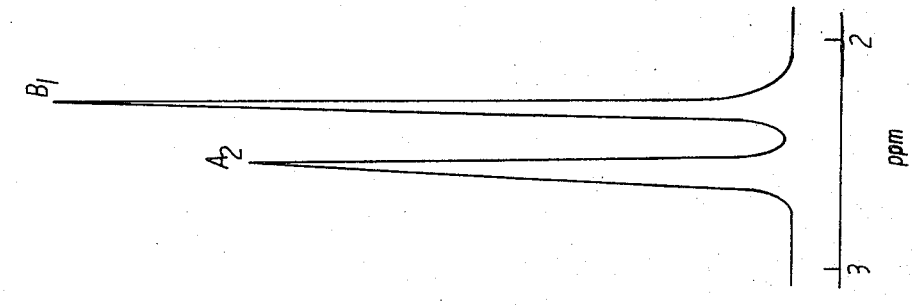
FIG. 2b is a partial nmr spectrum of aspirin in polyethylene glycol 400 which has been stored for two weeks at 45° C.
Figure 2A:
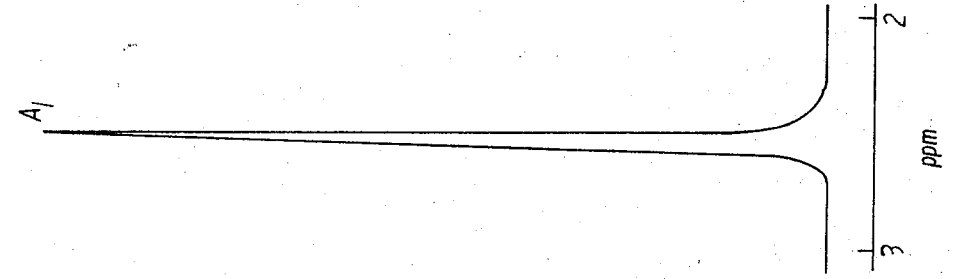
FIG. 2a is a partial nmr spectrum of freshly prepared aspirin in polyethylene glycol 400.

The fact that the observed decomposition reactions were not caused by hydrolysis of aspirin, but rather by transesterification of the aspirin with the polyethylene glycol base was established by nmr spectroscopy. FIG. 2a is a partial nmr spectrum of a freshly prepared aspirin-polyethylene glycol 400 mixture (peak $A_1$) and of the same mixture (FIG. 2b) after being stored for two weeks at 45° (peaks $A_2$ and $B_1$). Peak $A_1$ represents the acetyl methyl protons of aspirin at 2.6 p.p.m. and occurs at the same position as $A_2$. Peak $B_1$ occurs at 2.3 p.p.m. and is a new absorption resulting from the degradation of aspirin or polyethylene glycol.

Figure 3B:
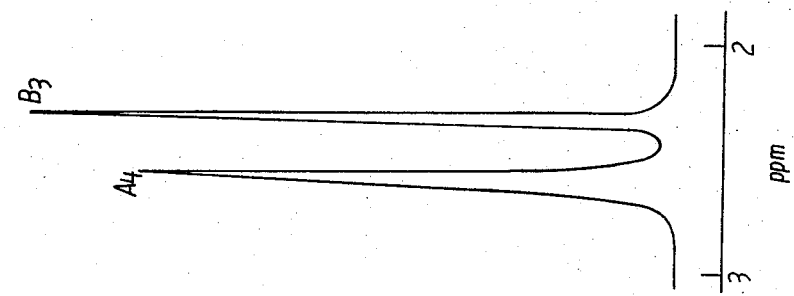
FIG. 3b is a partial nmr spectrum of a freshly prepared mixture of aspirin and acetylated polyethylene glycol 400.
Figure 3A:
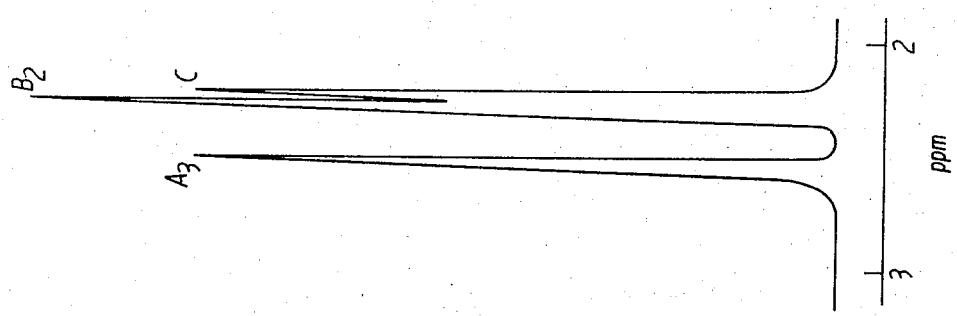
FIG. 3a is a partial nmr spectrum of an aged mixture of an aspirin-polyethylene glycol 400 composition containing added acetic acid.

The nature of the new species which gave rise to peak $B_1$ was elucidated as follows. Peaks $A_3$, $B_2$ and C of FIG. 3a were found in an aged mixture of aspirin in polyethylene glycol 400 and added acetic acid. Peak C is new and different from peaks $B_1$ and $B_2$ while peaks $A_3$ and $B_2$ of FIG. 3a are the same as peaks $A_2$ and $B_1$ of FIG. 2b. Comparison of FIGS. 2 and 3 shows that peak C is due to the methyl protons of acetic acid and that acetic acid is not a product of the decomposition of aspirin polyethylene glycol 400.

Since acetic acid was not found as a degradation product, the possibility of transesterification between aspirin and polyethylene glycol 400 was considered. The fact that transesterification indeed occurred was established by the peaks $A_4$ and $B_3$ in the nmr spectrum of FIG 3b of a freshly prepared mixture of aspirin and acetylated polyethylene glycol 400. Peaks $A_4$ and $B_3$ are identical to peaks $A_2$ and $B_1$ of FIG. 2a. Thus peaks $B_1$ and $B_3$ represent the degradation product, polyethylene glycol acetate, of the transesterification reaction between aspirin and polyethylene glycol.

Having generally described this invention, a further understanding can be obtained by reference to certain specific examples which are provided herein for purposes of illustration only and are not intended to be limiting unless otherwise specified.

Aspirin samples were prepared in which 12% aspirin was incorporated in methoxyethylene glycol 550, polyethylene glycol 400 acetate and in a mixture of polyethylene glycols (400:1540:6000=27:31:42). Three portions of each of the three samples were stored in air-tight amber containers in a desiccator at temperatures of 4°, 26° and 45° C. Weighed samples of each solution were dissolved in 1% acetic acid-chloroform at various time intervals over a period of 30 days and the aspirin and salicylic acid content of each sample was measured by an ultraviolet spectrophotometric technique. The 278 nm and 308 nm absorption bands were used for aspirin and salicylic acid respectively.

The following table shows the stabilizing effect blocked polyhydric alcohol derivatives has on fluid acetylsalicylic acid solutions which have been stored for thirty days at the three temperatures indicated. The results show the remarkable stabilizing effect that methozypolyethylene glycol 550 and polyethylene glycol 400 acetate have on acetylsalicylic acid in comparison to the mixture of unblocked polyethylene glycols. Most noteworthy is the comparison of acetylsalicylic acid in polyethylene glycol 400 acetate at 45° C. and acetylsalicylic acid in a mixture of polyethylene glycols at 45° C. Fully one quarter of the acetylsalicylic acid in the mixture of unblocked polyethylene glycols had deteriorated while virtually no deterioration was noted for the drug in polyethylene glycol 400 acetate.

|  | Mixture of unblocked polyethylene glycols [1] | Methoxy- polyethylene glycol 550 | Polyethylene glycol 400 acetate |
|---|---|---|---|
| Temperature, degrees: |  |  |  |
| 4 | 98.3 | 99.5 | 99.0 |
| 26 | 90.0 | 98.5 | 99.0 |
| 45 | 73.5 | 91.3 | 99.0 |

[1] Polyethylene glycol mixture: PEG 400:1,540:6,000=27:31:42.

Figure 6:
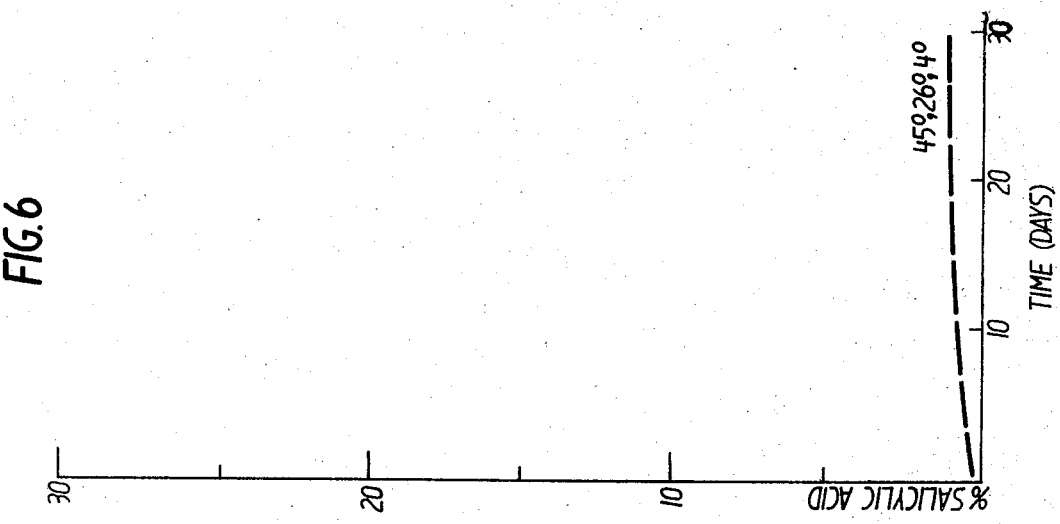
Figure 5:
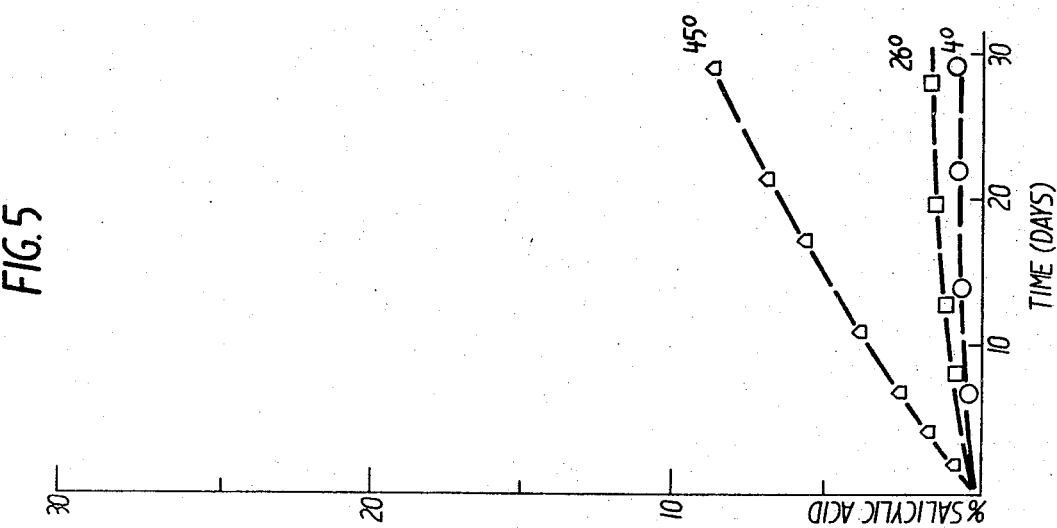
FIG. 5 is a pot of the rate of appearance of salicylic acid versus time in methoxy polyethylene glycol 550 at several temperatures; and, FIG. 6 is a plot of the rate of appearance of salicylic acid versus time in polyethylene glycol acetate 400 at several temperatures.
Figure 4:
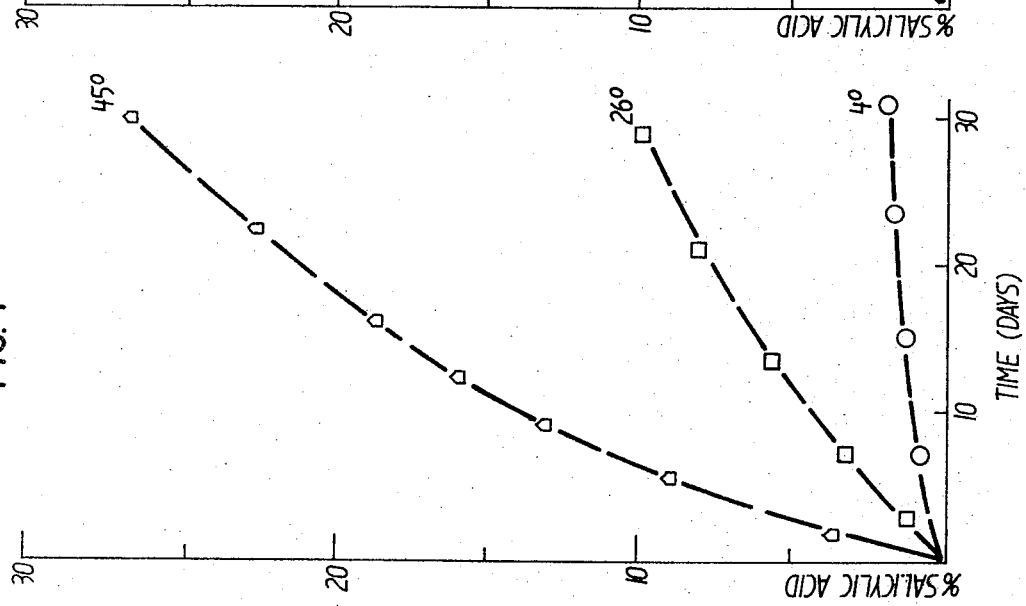
FIG. 4 is a plot of the rate of appearance of salicylic acid versus time in a mixture of polyethylene glycols at several temperatures.

The stabilizing effect of the blocked polyhydric alcohol derivatives of this invention is further shown in FIGS. 4-6. FIG. 4 is a plot of the percent salicylic acid formed over a time period up to 30 days for an acetylsalicylic acid composition in a mixture of unblocked polyethylene glycols at 4°, 26°, and 45° C. Most noteworthy is the extensive decomposition of acetylsalicylic acid to salicylic acid which occurs at 45° C.

FIG. 5 is the same type of plot as FIG. 4, except that it shows the decomposition of acetylsalicylic acid in methoxypolyethylene glycol 550. The graph shows that the rate of deterioration or transesterification of acetylsalicylic acid to salicylic acid is substantially reduced in the blocked polyhydric alcohol derivative. An even greater degree of stabilization is imparted by a solvent medium of polyethylene glycol 400 acetate as shown in FIG. 6, wherein virtually no deterioration was observed at 4°, 26° and 45° C.

Having now fully described the invention it will be apparent to one of ordinary skill in the art that many changes and modifications can be made thereto without departing from the spirit or scope of the invention as set forth herein.

What is claimed as new and intended to be claimed by Letters Patent is:

1. A stabilized aspirin composition which comprises the admixture of from 60 to 0.1 percent by weight acetylsalicylic acid and from 40 to 99.9 percent by weight of a blocked polyhydric alcohol wherein said polyhydric alcohol is selected from the group consisting of polyethylene glycol, polypropylene glycol, polybutylene glycol, polyisobutylene glycol, polyamylene glycol, poly(1,3)propanediol, poly(1,4) butanediol, poly(1,3)isobutylenediol, poly (1,5)-pentanediol, poly(1,4)-pentanediol, poly(1,3)-pentanediol, poly(1,6) - hexanediol, poly(1,5) - hexanediol, poly(1,4)-hexanediol, poly(1,3)-hexanediol. ethylene glycol, propylene glycol, 1,3-propanediol, butylene glycol, isobutylene glycol, 1,4-butanediol, amylene glycol, isoamylene glycol, 1,4-butanediol, 1,5-pentanediol, 1,2-hexanediol, 1,3-hexanediol, 1,4-hexanediol, 1,5-hexanediol, 1,6-hexanediol, glycerine, 1,2,3-butanetriol, 1,2,4-butanetriol, 1,2,3-pentanetriol, 1,2,4-pentanetriol, 1,2,5-pentanetriol, 1,2,3-hexanetriol, 1,2,4-hexanetriol, 1,2,5 - hexanetriol, 1,2,6-hexanetriol, 1,3,4-hexanetriol, 1,3,5 - hexanetriol and 1,3,6-hexanetriol, and wherein said blocking group is selected from the group consisting of formyl, acetyl, pro-t-butoxy, phenoxy, tolyloxy, xylyloxy, 1-naphthoxy, 2-naphthoyl, phenylacetyl, phenyl-3-propionyl, phenyl-4-butyryl, methoxy, ethoxy, propoxy, isopropoxy, butoxy, t-butoxy, phenoxy, tolyloxy, xyloxy, 1-naphthoxy, 2-naphthoxy, phenylmethoxy, phenylethoxy, phenyl-3-propoxy, phenyl-2-propoxy, phenyl-2-butoxy, wherein at least one of the protons of the OH groups of the polyhydric alcohol is replaced with said blocking group, such that transesterification between said polyhydric alcohol and said acetylsalicyclic acid is hindered.

2. The composition of Claim 1, wherein said loweralkylacyl is formyl, acetyl, propionyl or butyryl, and wherein said loweralkyl ether is methoxy, ethoxy, propoxy, isopropoxy, butoxy or t-butoxy.

3. The composition of Claim 1 wherein said polyalkylene glycol is polyethylene glycol, polypropylene glycol, polybutylene glycol or poyisobutyene glycol.

4. The composition of Claim 1, wherein said blocked polyhydric alcohol is polyethylene glycol acetate, polypropylene glycol acetate, methoxypolyethylene glycol or methoxypolypropylene glycol.

5. The composition of Claim 1, wherein said acetylsalicylic acid is admixed with polyethylene glycol acetate.

6. The composition of Claim 1 wherein said acetylsalicylic acid is admixed with methoxyethylene glycol.

7. A stabilized aspirin composition which comprises the admixture of from 60–0.1% by weight acetylsalicylic acid and from 40–99.0% by weight of a blocked polyhydric alcohol selected from the group consisting of methoxypolyethylene glycol, ethoxypolyethylene glycol, phenoxypolyethylene glycol, phenylmethoxypolyethylene, phenylethoxypolyethylene glycol, methoxypolypropylene glycol, ethoxypolypropylene glycol, phenoxypolypropylene glycol, phenylmethoxypolypropylene glycol, phenylethoxypolyethylene glycol, polyethylene glycol formate, poyethylene glycol acetate, polyethylene glycol propanoate, poyethylene glycol benzoate, polyethylene glycol toluate, poypropylene glycol formate, polypropylene glycol acetate, polypropylene glycol propanoate, polypropylene glycol benzoate and polypropylene glycol toluate.

References Cited

Chem. Abst. (1), 58–6651f (1958).
Chem. Abst. (2), 52–7615i (1952).
Chem. Abst. (3), 70–109,137w (1969).

STANLEY J. FRIEDMAN, Primary Examiner

U.S. Cl. X.R.

424—235